UNITED STATES PATENT OFFICE.

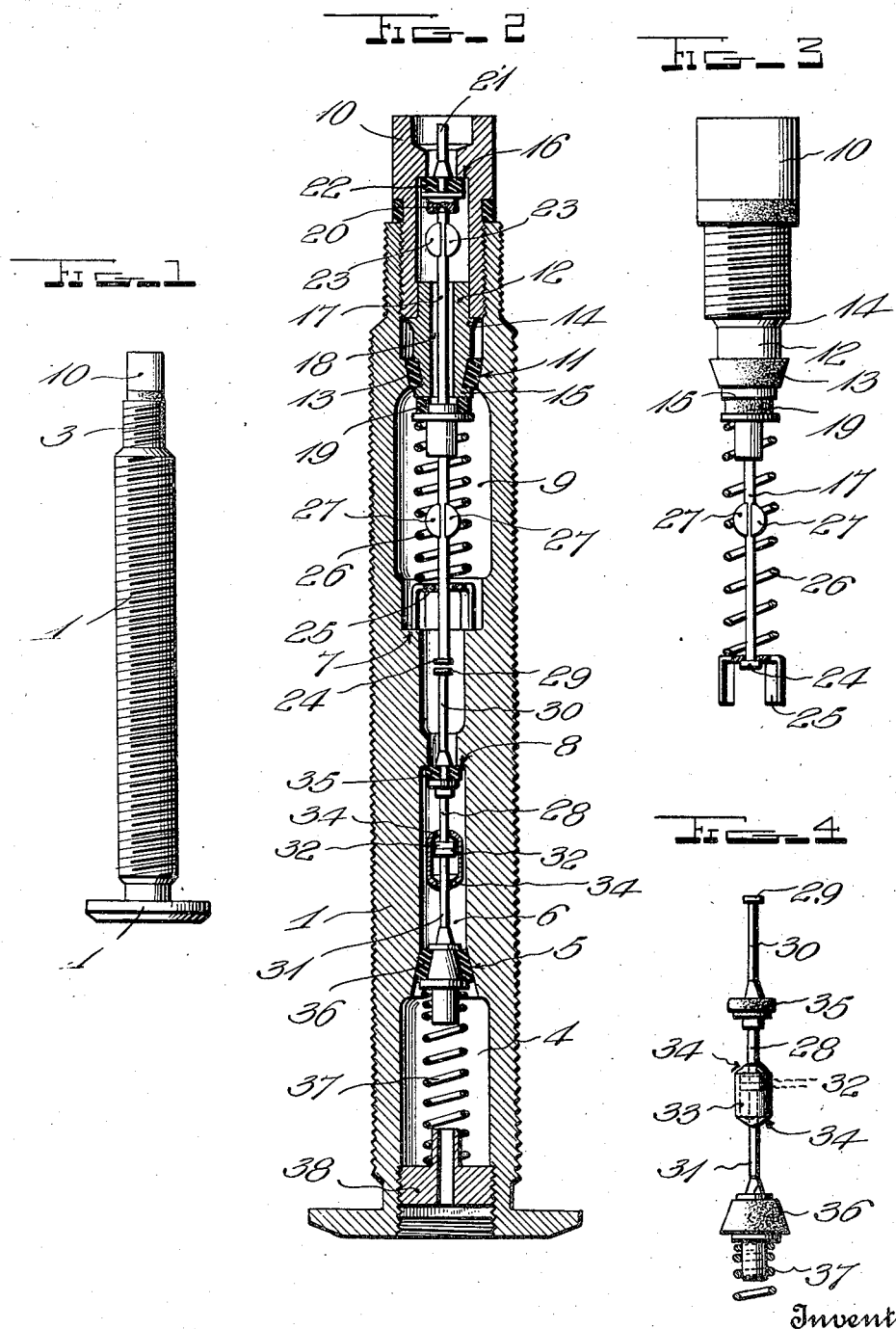

IRA W. COLE, OF PLAINFIELD, NEW JERSEY.

TIRE-VALVE.

1,245,873. Specification of Letters Patent. Patented Nov. 6, 1917.

Application filed February 19, 1917. Serial No. 149,608.

*To all whom it may concern:*

Be it known that I, IRA W. COLE, a citizen of the United States, residing at Plainfield, in the county of Union and State of New Jersey, have invented certain new and useful Improvements in Tire-Valves; and I do declare the following to be a full, clear, and exact description of the invention, such as will enable others skilled in the art to which it appertains to make and use the same.

My invention has for its principal object to provide an improved construction and arrangement of parts whereby a plurality of inwardly opening valves may be employed in the usual tubular valve casings of automobile and other vehicle tires, the intention being to cause certain valves to operate to prevent the discharge of air in case one or more of the other valves should not properly engage its seat for any reason.

Further objects are to dispose the stems of the several valves so as to permit all of said valves to be opened by pressing the outermost stem inwardly and to carry the inner and outer series of valves respectively by inner and outer stems so that they may be easily inserted and removed when required.

Yet another object is to form one of the valve stems of a plurality of slidably connected sections, each of which carries a valve, whereby in case one valve does not properly seat it will not affect any other.

With the foregoing general objects in view, the invention resides in the novel features of construction and unique combinations of parts hereinafter fully described and claimed, the descriptive matter being supplemented by the accompanying drawing which constitutes a part of this specification, and in which:

Figure 1 is a side elevation of the improved valve;

Fig. 2 is a longitudinal section thereof;

Fig. 3 is a side elevation of the outer valve mechanism; and

Fig. 4 is a similar view of the inner mechanism.

In the drawings above briefly described, the numeral 1 has reference to the usual tubular externally threaded valve casing having a head 2 at its inner end to assist in connecting it to a tire or tube, the outer end of said casing being reduced at 3 for reception in the usual valve cap (not shown). The bore of the casing 1 is enlarged at its inner end as shown at 4 and at one end of this enlargement is tapered to form a valve seat 5 which decreases in size toward the outer end of the casing, said seat here merging into a comparatively small portion 6 of the bore, which portion, at the end remote from the seat 5, is formed with a ledge 7 facing toward the outer end of the casing 1. A second valve seat 8 having a flat face, is formed between the ends of the contracted portion 6 by further contracting said portion as shown.

The ledge 7 is formed at the juncture of the portion 6 of the bore with the enlarged outer portion 9 thereof, the extreme outer end of said portion 9 having a cap 10 threaded therein, while adjacent the inner end of this cap, portion 9 is contracted to form a tapered shoulder 11 whose larger end is located toward the outer end of casing 1.

A plug 12 is provided with a packing ring 13 resting on the shoulder 11 and with an external shoulder 14 upon which the lower end of the cap 10 bears, the outer end of said plug being received in said cap. The inner end of the plug 12 is provided with a flat valve seat 15 while a similar seat 16 is formed in the outer portion of the cap 10.

A valve stem 17 passes through the central bore 18 of plug 12 and is provided with a valve 19 preferably of the disk type which coöperates with the seat 15. The outer end of the stem 17 is received in a socket 20 in the inner end of a short valve stem 21 which slides loosely through an opening in the seat 16 and carries a flat valve 22 coöperating with said seat. The stem 17 is disconnected from the socket 20 and adjacent its point of contact therewith is flattened in two directions to form wings 23 which will prevent removal of said stem from the bore 18.

The extreme inner end of the stem 17 is formed with a head 24 which is positioned in the contracted portion 6 of the bore of the casing and spaced outwardly from the seat 8. Adjacent its head 24 the stem 17 passes slidably through a spider 25 which rests on the ledge 7, and a coiled spring 26 is interposed between said spider and the valve 19 so that the tension of this spring normally serves to seat said valve as well as to shift the entire stem outwardly to cause it to hold the valve 22 in operative position. Wings 27 similar to those above referred to by the numeral 23 are formed on the stem 17 between the spider 25 and the valve 19 and serve to prevent accidental displacement of the parts.

An inner stem 28 is provided on one end with a head 29 spaced slightly from the head 24, said stem being formed of outer and inner sections 30 and 31 disposed in alinement and having abutting heads 32 on their inner ends. A sleeve 33 is passed around said heads and has its ends bent inwardly at 34 to slidably connect the two sections 30 and 31 of the stem. The outer stem section 30 is provided with a flat valve 35 coöperating with seat 8, whereas a cone valve 36 is carried by the section 31 for co-action with the seat 5. A coiled spring 37 bears at one end against the valve 36 and at its other against an apertured plug 38 which is threaded into the extreme inner end of the casing 1.

Experience has taught that there is more danger of the valves clogging from dust such as particles of soapstone from the interior of the tube or tire, than from extrinsic matter coming from other sources. These conditions, however, are fully met by the improved construction. If particles of dust or the like should prevent seating of the valve 36, the stem section 31 will not unseat valve 35 on account of the sliding connection afforded by the heads 32 and sleeve 33. Similarly, if valve 35 is held from its seat from any cause, although it will interfere with the proper seating of valve 36, it will in no manner affect the proper operation of the valves 19 and 22. If valve 19 cannot properly rest upon seat 15, the valves 35, 36, and 22 will still remain active, and in case 22 would not properly seat it will interfere with the closing of the valve 19, but even then the two valves 35 and 36 will prevent the escape of air.

In case it is necessary to repair any of the outermost valve mechanism including briefly the stem 17 and valves 19 and 22, the cap 10 may be removed, whereupon plug 12 and stem 17 with the parts carried by the latter may be withdrawn from the casing 1. Even though this entire outer arrangement of valves is now removed, the inner valves 35 and 36 will prevent deflation of the tire. If these last named valves are to be repaired, however, it is necessary to detach the casing 1 from the tire or tube since the parts in question are inserted into the inner end of said casing as shown.

From the foregoing, taken in connection with the accompanying drawing, the construction and manner of operation of the invention will be clear and it will be observed that although it is of comparatively simple and inexpensive nature, the improved valve will be highly efficient. For these reasons the construction shown constitutes the preferred form of the device, but it is to be understood that within the scope of the invention as claimed, numerous changes may be made without sacrificing the principal advantages.

I claim:

1. In a tire valve, the combination of a tubular valve casing, a valve stem in said casing formed of a pair of slidably connected sections, inwardly opening valves carried on said sections, and seats in the casing for said valves.

2. In a tire valve, the combination of a tubular valve casing, a valve stem in said casing formed of a pair of alined stem sections having heads on their meeting ends, a sleeve receiving said heads therein and having its ends bent inwardly whereby said stem sections are slidably connected, an inwardly opening valve on each stem section, and seats in the casing for said valves.

3. In a tire valve, the combination of a tubular casing having between its ends an internal ledge and near its outer end an internal annular shoulder, a plug inserted in the outer end of the casing and resting on said shoulder, said plug having a longitudinal port with a valve seat formed at its inner end, a cap threaded in said outer end of the casing for securing said plug in place, said cap having an internal valve seat, a valve coacting with the seat of said cap, an additional valve coöperating with the seat of said plug, a stem carrying said additional valve and abutting the first named valve to seat the same, a coiled spring for shifting said stem to operative position, and a spider resting on said ledge and serving as an abutment for said spring.

4. In a tire valve, the combination of a plug adapted to be inserted in the outer end of a valve casing, the inner end of said plug having a gasket for contact with the usual internal shoulder of the casing, and said plug having a longitudinal bore formed with a valve seat at its inner end, a cap adapted to be threaded into the outer end of the valve casing for securing said plug in place, said cap having an internal valve seat, a valve coacting with the seat of said cap, an additional valve coöperating with the seat of said plug, a stem carrying said additional valve and abutting the first named valve to seat the same, a coil spring for shifting said stem to operative position, and a spider for the inner end of said spring adapted to rest upon a ledge in the valve casing.

In testimony whereof I have hereunto set my hand in the presence of two subscribing witnesses.

IRA W. COLE.

Witnesses:
 SAMUEL W. DAVENPORT,
 LILLIAN S. KOEHLER.